June 22, 1971  YOUNG HO KIM ET AL  3,586,486
GAS ANALYZER

Filed Feb. 23, 1968  4 Sheets-Sheet 1

INVENTORS.
YOUNG HO KIM
JOHN N. PATTISON
BY
Robert L. Thornton
ATTORNEY

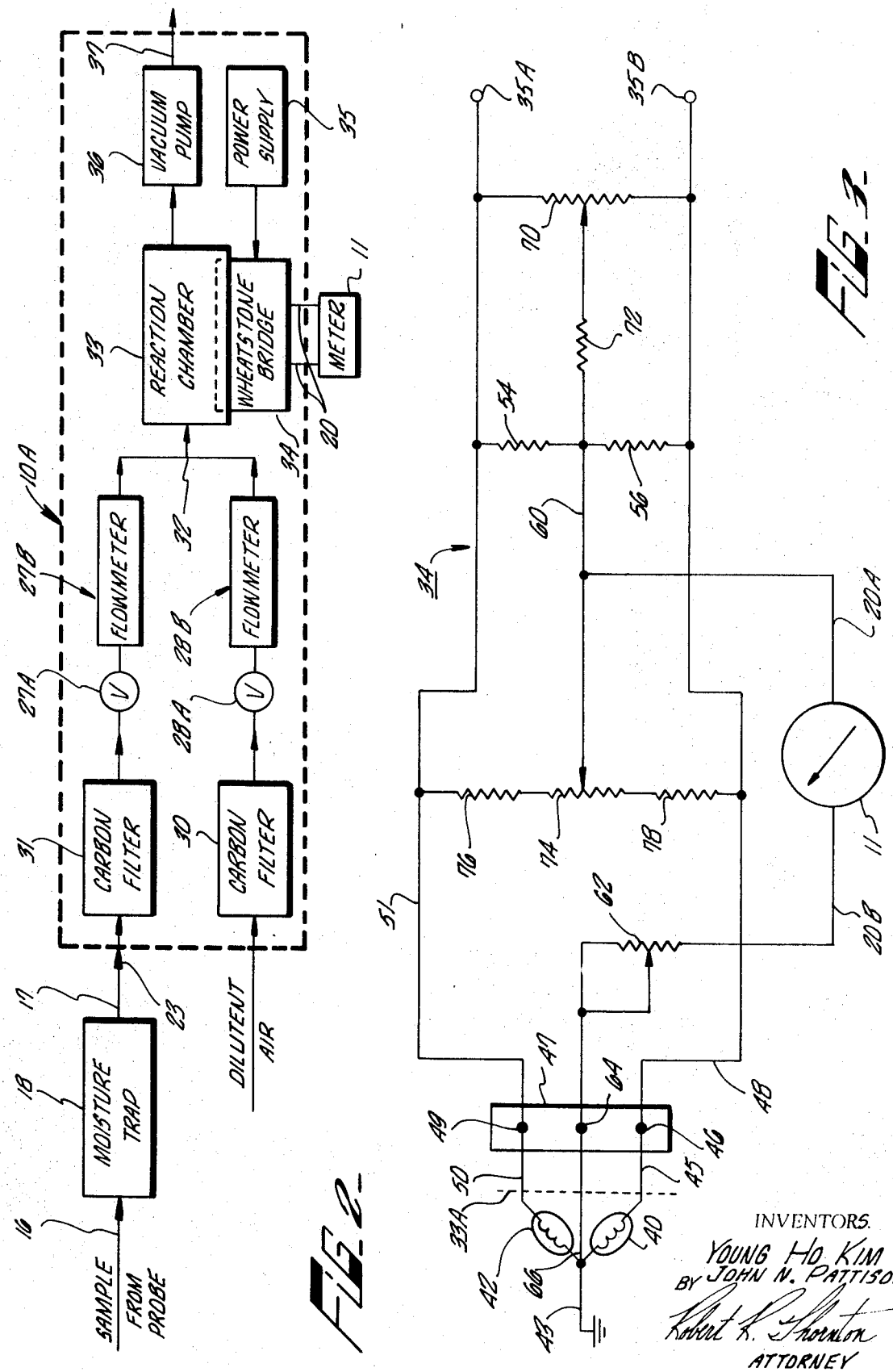

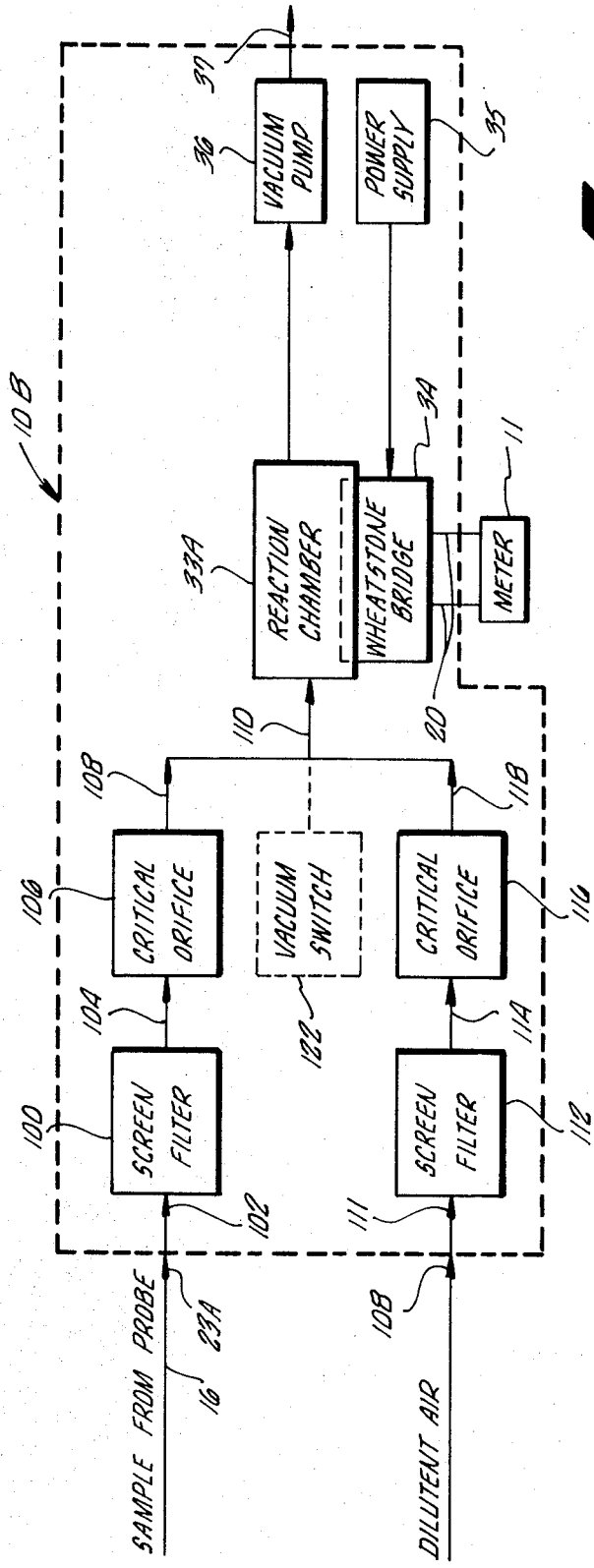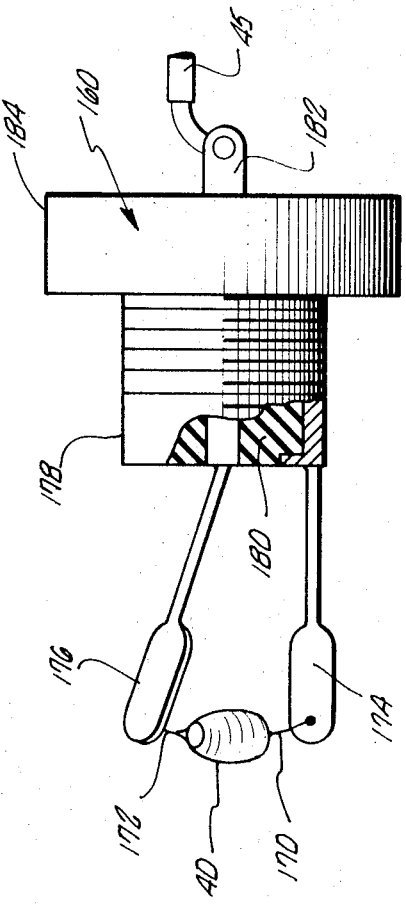

June 22, 1971 YOUNG HO KIM ET AL 3,586,486
GAS ANALYZER
Filed Feb. 23, 1968 4 Sheets-Sheet 4

INVENTORS.
YOUNG HO KIM
JOHN N. PATTISON
BY
Robert R. Thornton
ATTORNEY

United States Patent Office 3,586,486
Patented June 22, 1971

3,586,486
GAS ANALYZER
Young Ho Kim, Santa Clara County, Calif., and John N. Pattison, Hamilton County, Ohio, assignors to American Bosch Arma Corporation, Garden City, N.Y.
Filed Feb. 23, 1968, Ser. No. 707,814
Int. Cl. G01n 25/32, 31/10; H01c 7/04
U.S. Cl. 23—254
13 Claims

ABSTRACT OF THE DISCLOSURE

A catalytic combustion type gas analyzer which mixes gas and air in a selected ratio. The mixture is passed over a pair of electrically heated resistance elements, only one of which is catalytically active, connected in a Wheatstone bridge measuring circuit. Any combustible gas in the sample is oxidized at the catalytic surface of the active element, producing an element temperature rise proportional to the percentage of combustible gas, thereby unbalancing the Wheatstone bridge. The elements utilize a ceramically coated electrical conductor, over which a glass seal is formed. An aluminum or beryllium oxide coating covers the glass seal. The catalytically active element has a catalytic coating over the oxide coating.

Gas analyzers of the Wheatstone bridge type are well known and generally rely upon a change in the impedance of an active element in the bridge circuit in response to the presence of a gas. The active element may be a simple thermal detector element, or the active element may in fact initiate combustion of the gas, as is described in U.S. Pat. No. 2,023,731. In either event, the impedance of the active element in the bridge changes in response to the presence of the gas. This change in impedance unbalances the Wheatstone bridge, so as to produce an electrical output, the magnitude of which is a function of the concentration of the gas being detected.

The present invention is concerned with gas analyzers of the latter type, in which combustion is initiated at the active element of the device. In such devices, the catalytic element and the heating element may be one and the same, that is, the element utilized as the catalyst is heated by electrical resistance heating to the temperature at which the catalytic reaction occurs. In such devices, a compensating element is utilized as one arm of the Wheatstone bridge, in order to balance the effects of the ambient conditions upon the active element. Therefore, in order to minimize error inherent in the Wheatstone bridge circuitry operation, it is desirable to have the electrical resistance and heat transfer characteristics of the compensating element as nearly equal to those characteristics of the active element as is possible.

Two basic systems are utilized for the disposition of the active and compensating elements with respect to the gas sample to be analyzed. These systems are exemplified in U.S. Pat. No. 2,310,472 and U.S. Pat. No. 2,583,930. In the former, the active and compensating elements are isolated from the direct flow of the gas samples. In the latter, the active and compensating elements are exposed to the direct flow of the samples to be analyzed. In isolating the elements from the sample, a loss in response time of the device is inherent. In systems utilizing direct flow, unless the active and compensating resistance elements are formed of the same material, the thermal coefficients of resistance will inherently be unequal, and thus introduce bridge unbalance due to factors other than the catalytic combustion of the gas to be analyzed. If the resistance elements are formed of the same material, as shown in U.S. Pat. No. 2,583,930, for example, element evaporation, which is a function of element temperature, will cause a zero drift in the bridge balance.

Attempts to avoid the evaporation problem by means of a refractory coating of the resistance element, on to which coating, on the active element, a catalytic coating is applied, have heretofore proved unsatisfactory, particularly at high temperatures, since such a procedure inherently results in two elements which have different heat transfer characteristics. Furthermore, refractory material normally is so porous as to permit the evaporation of the resistance element filament and filament material migration through the refractory material. If the filament is itself a catalytic material, the migration of the evaporated material to the surface of the compensating element will result in the compensating element also producing catalytic combustion of the gas to be analyzed, thus giving an incorrect indication of concentration. Therefore, such elements conventionally are operated at comparatively low temperatures, that is, at less than 900 degrees Fahrenheit. However, operation at such temperatures does not, if the gas to be analyzed contains lead compounds, produce a sufficiently high reaction temperature at the surface of the catalytic element to evaporate the lead compounds. The lead compounds thus coat the active element and poison the catalyst, resulting in element inoperability.

An additional disadvantage with respect to currently known devices resides in the method by which the gas sample is applied to the active and compensating elements. Thus, in the aforementioned U.S. Pat. No. 2,310,472, a bulb feed is used so as to extract a sample from the atmosphere and apply it to the device. The bulb is squeezed and so produces a variable flow rate of the sample into the device. As the compensating and active elements are sensitive to the rate of flow of the sample, the sensing elements are isolated from the sample, resulting in slow reaction time of the device. If the active and compensating elements are placed directly in the sample flow stream, as is shown in the aforementioned U.S. Pat. No. 2,583,930, the fluctuations in sample flow rate, as well as wide variations in sample flow composition, result in erroneous indications by the analyzer of gas composition.

The present invention includes both a gas analyzer and catalytic and compensating resistance elements especially designed for use in the gas analyzer. However, the analyzer has utility other than with the particular resistance elements, and the resistance elements have utility other than with the analyzer.

As to the gas analyzer aspects of the present invention, such a combustible gas analyzer includes a catalytic or active resistance element, and a compensating resistance element which is catalytically inert and has the same overall heat transfer characteristics as the catalytic resistance element. These two resistance elements are connected in a conventional Wheatstone bridge type electrical circuit. A source of the gas to be analyzed and a source of diluent gas are provided, the diluent gas being, for example, air. Means are provided for initiating a constant flow of a selected ratio mixture of said gases simultaneously against the catalytic resistance element and the compensating resistance element.

In the resistance element aspects of the invention, both resistance elements consist of a filament formed of an electrical conductor whose electrical resistance varies with temperature and have a glass seal formed about the filament. Preferably, a ceramic coating separates the glass seal from the filament and, in the compensting element, a black platinum film coats the ceramic coating. An oxide coating is formed on the glass seal, which coating is of beryllium for the compensating element and may be either beryllium or aluminum for the active element. A catalytic coating of platinum or other catalytic material is formed on the oxide coating for the active element.

The invention may be more readily understood by referring to the accompanying drawings in which:

FIG. 2 is a block diagram of one embodiment of the gas analyzer of the invention;

FIG. 3 is a schematic diagram of a Wheatstone bridge circuit utilizable with the present invention;

FIG. 4 is a block diagram of another embodiment of the gas analyzer of the present invention;

FIG. 6 is a view, partially in section, of a resistance element according to the present invention, illustrating its support and electrical connections;

Figures 1, 5:
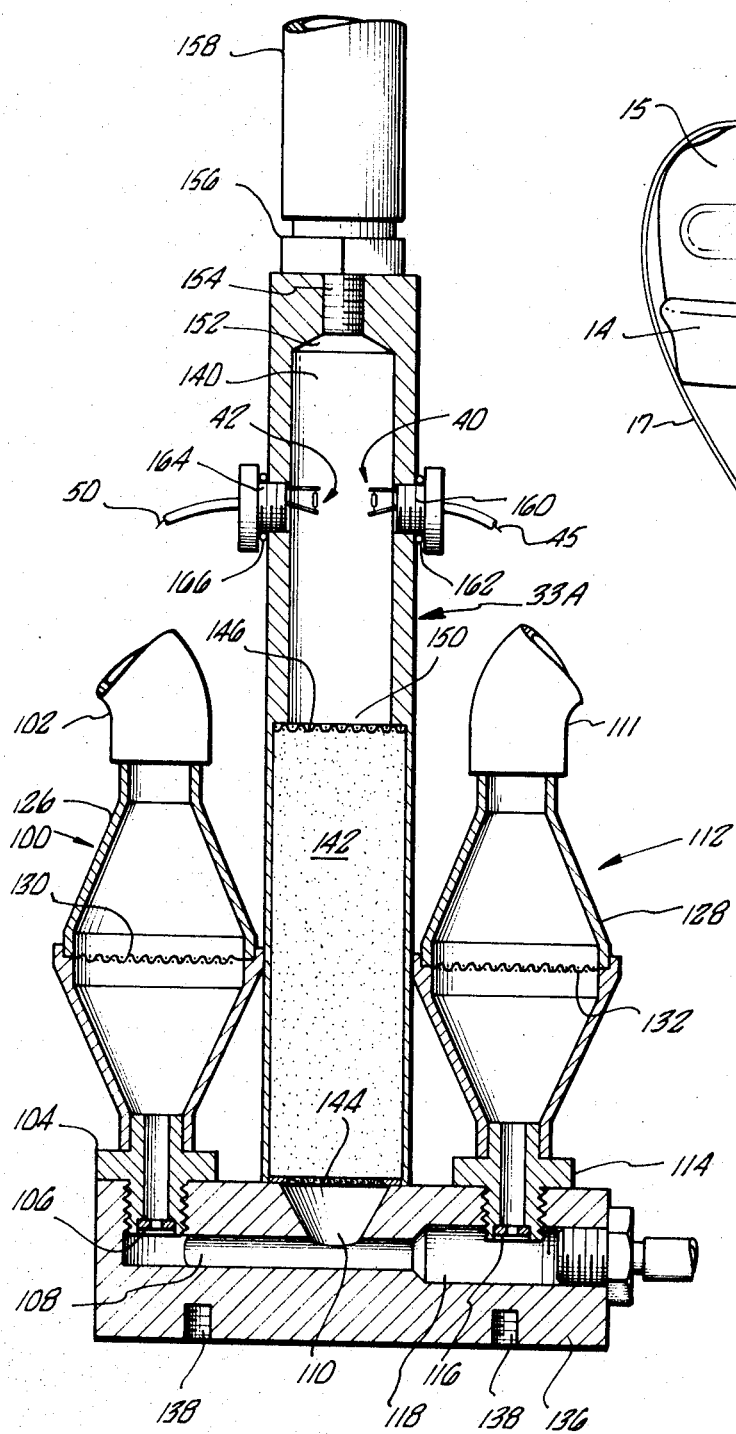
FIG. 1 is illustrative of the utilization of the invention in conjunction with the analysis of the exhaust gases of an automobile.
FIG. 5 is a view in section of a portion of a gas analyzer constructed in accordance with the block diagram of FIG. 4.

Referring now to FIG. 1, there is shown an embodiment of the present invention in operation analyzing the combustible gas content of the exhaust gases of an automobile. In FIG. 1, the gas analyzer of the present invention is seen to consist of a control and analysis cabinet 10, a meter 11, and a sample pickup 12. The sample pickup 12 is held in position by a mounting bracket 13 which is attached to a rear bumper 14 of an automobile 15. The mounting bracket 13 connects a probe portion 16 of the sample pickup to a hose 17, which applies the sample to the analysis cabinet 10. A water trap 18 is connected between the probe 16 and the hose 17, in order to trap any moisture which may be contained in the sample prior to the sample's application to the analysis cabinet 10.

The analysis cabinet 10 is connected to the meter 11 by a two-wire electrical cable 20, which is preferably of a length such that the meter 11 may be placed under the open front hood of the automobile during an analysis to facilitate adjustment of the engine for minimum combustible gas content of the exhaust gases. To facilitate such an adjustment, the meter 11 is equipped with a handle 21, so that the meter may be hung under the opened automobile hood when making engine adjustments. In the embodiment shown in FIG. 1, the analysis cabinet 10 includes a sample inlet connector 23 and a meter jack 24, as well as an on-off power switch 25 and operating lights 26. A pair of flow controls 27, 28 are included on the front face of the analysis cabinet 10. A handle 29, attached to the top of the cabinet 10 provides means for carrying the cabinet.

In operation, the probe 16 is inserted into the exhaust pipe of the automobile while the engine is running. The combustible gases, particularly hydrogen and carbon monoxide, contained in the exhaust gases are oxidized by the analyzer, in response to which a Wheatstone bridge imbalance is produced. The magnitude of the imbalance is indicated on the meter 11, which may be calibrated, for example, in percent of carbon monoxide, as the ratio of hydrogen to carbon monoxide is approximately constant at 1:3.

Referring now to FIG. 2, there is shown, in block diagram form, the embodiment of the invention illustrated in FIG. 1. In FIG. 2, the components contained within the analysis cabinet 10 are indicated as enclosed by the dotted line 10A. Also illustrated in FIG. 2 is a source of diluent air, which is applied to the analysis cabinet 10A. The source of diluent air may be simply an aperture in the analysis cabinet itself, and so is not specifically illustrated in FIG. 1. The diluent air is applied in the analysis cabinet 10A to a filter 30 consisting of activated carbon. The activated carbon filter 30 serves to remove moisture and other impurities from the diluent air prior to its application to a flow meter 28B through a flow control valve 28A, corresponding to the flow control 28 of FIG. 1. In addition, the activated carbon serves to smooth out flow rate variations which might overwise occur.

As is seen in FIG. 2, the gas sample from the probe is applied through probe portion 16 of the sample pickup to the moisture trap 18 and, from the moisture trap 18, through the hose 17 to a filter 31, consisting of activated charcoal, similar to the filter 30 heretofore referred to. The filters 30, 31 may consist, for example, of about thirty cubic centimeters of activated charcoal each. The sample, after being filtered through filter 31 to remove moisture, rust, scale, dust, and other impurities, is applied to the flow control 27, consisting of a control valve 27A and flow meter 27B. From the flow meters 27B, 28B, the analysis sample and diluent air are applied through a conventional T-joint 32 or the like to mix the sample and diluent air prior to entry into a reaction chamber 33.

As will be hereinafter explained with respect to FIG. 5, a catalytic combustion resistance element and compensating resistance element are disposed in the reaction chamber 33, and constitute a portion of a Wheatstone bridge circuit 34. The Wheatstone bridge circuit 34 is connected to the meter 11 by the two-wire electrical cable 20. The Wheatstone bridge circuit 34 is energized by a power supply 35. A vacuum pump 36 provides the source of pressure differential which draws the sample and the diluent air into the reaction chamber 33. After oxidation in the reaction chamber, the oxidized mixture passes through an exhaust outlet 37 of the vacuum pump 36 into the atmosphere.

FIG. 3 is a schematic diagram of the Wheatstone bridge circuit 34. An input voltage of about 2.70 volts DC is applied to the Wheatstone bridge circuit 34 across a pair of input terminals 35A, 35B. In addition to providing the supply voltage for the Wheatstone bridge, this input voltage is utilized to heat by electrical resistance heating a catalytic combustion resistance element 40 and a compensating resistance element 42. A ground connection 43 provides electrical circuit continuity. As is shown by the reference numeral 33A, indicating the inner wall of the reaction chamber 33, the catalytic combustion resistance element 40 and compensating resistance element 42 are located within the reaction chamber. The catalytic combustion resistance element 40 is provided with a connecting lead 45 which is connected at a terminal 46 of a terminal board 47 to a voltage supply lead 48. The lead 48 is connected to one of the voltage input terminals 35. The compensating element 42 is similarly connected to a terminal 49 through a lead 50. The terminal 49 is connected to the other of the voltage input terminals 35 through a voltage supply lead 51. Thus, the elements 40, 42 form two arms of the Wheatstone bridge circuit. The opposite arms of the Wheatstone bridge circuit are formed primarily by a pair of matched resistors 54, 56 serially connected between the voltage supply leads 48, 51 at a terminal 58. Also connected to the terminal 58 is a lead 20A, through a connecting lead 60. The lead 20A is one of the input leads to the meter 11. A lead 20B, the other of the input leads to the meter 11, is connected through a calibrating potentiometer 62 to a terminal 64 on the terminal board 47. A ground lead 66 connects the terminal 64 to the common ground connection 43. A coarse zero adjustment of the bridge is provided by a coarse zero adjust potentiometer 70, which is connected to the terminal 58 through a protective resistor 72. A fine zero adjustment of the bridge is provided by means of a fine zero adjust potentiometer 74, which is connected between a pair of resistors 76, 78, of equal resistance. The resistors 76, 78 are connected, respectively, to the voltage supply leads 51, 48. Thus, it will be apparent that the balance of the bridge can be accurately adjusted by means of the potentiometer 70 and 74, while the sensitivity of the bridge can be controlled by means of the potentiometer 62.

In operation, the meter is adjusted to zero by means of the fine zero adjust potentiometer 74 and, if necessary, preliminary setting of the coarse zero adjust potentiometer 70. These adjustments are carried out with a sample consisting of air, identical in composition to the diluent air. For example, the zero adjustment is accomplished prior to insertion of the probe into the exhaust pipe of the engine. It will be apparent that the sensitivity control of the analyzer is utilized to calibrate the analyzer. Thus, a sample having a known percentage of combustible gas is applied to the probe, and the calibrating potentiometer 62 adjusted to give a meter reading equal to the known sample combustible gas composition.

FIG. 4 is a block diagram of an alternate embodiment of the present invention. In FIG. 4, the sample from the probe portion of the sample pickup passes directly into an analysis cabinet 10B, shown in dotted lines in FIG. 4 as enclosing the various analyzer components contained therewithin. The sample from the sample probe is applied through a sample inlet connector 23A to screen filter 100 through a sample inlet tube 102. The screen filter 100 removes excess water droplets from the gas sample as well as providing filtration with respect to rust, scale, and other gross particles. From the screen filter 100, a sample transfer connector 104 carries the sample to a critical orifice 106. The function of the critical orifice 106 is to provide a constant flow rate of the sample into a reaction chamber 33A. From the critical orifice 106, the sample flows through a sample transfer passage 108 into a mixing chamber passage 110.

Diluent air from the atmosphere flows through a diluent inlet 108, to which is connected a diluent inlet tube 111. The diluent inlet tube 111 applies the diluent air to a diluent screen filter 112, which serves to filter out impurities. From the screen filter 112, the diluent air is transferred by a transfer connector 114 to a critical orifice 116, which functions to provide a constant flow rate of diluent air through a transfer chamber 118 into the mixing chamber 110, where the diluent air and sample are mixed together prior to passage into the reaction chamber 33A.

A vacuum switch 122 is connected to the mixing chamber 110 in the preferred embodiment, providing an interlock function to prevent the operation of the analysis portion of the system unless an appropriate vacuum exists in the mixing chamber to insure the gas flow rates through the critical orifices approximate the critical flow rates of the orifices.

FIG. 5 is an elevation, partially in section, of an embodiment of the analysis portion of the device shown in FIG. 4. In FIG. 5, the screen filters 100, 112 are seen to be constituted by hollow bodies 126, 128 having filter screens 130, 132, extending transversely thereacross. The hollow bodies 126, 128 may be metal or plastic, and are preferably separable at the screens 130 to permit cleaning or replacement of the screens. The filter screens 130, 132 may be, for example, nylon screening of 100 microns mesh. The use of the screen filter eliminates the necessity for utilization of a water trap, by screening out water particles of a diameter greater than that which will be vaporized by the pressure drop existing across the critical orifice. In operation, excess water droplets, or water droplets of comparatively large diameter, impinge the screen filter so as to be separated out from the sample. As sample water concentration decreases or droplet size decreases due to evaporation, the water droplets vaporize and the water vapor passes through the screen. Thus, the screen filter eliminates the necessity for the water trap 18 as shown in FIG. 1, accomplishing the same result.

As shown in FIG. 5, the critical orifices 106, 116 may be connected directly to the sample and diluent air transfer connectors 104, 114. The critical orifices themselves may, for example, consist of $5/16$ inch diameter brass shims, of approximately $32/1000$ of an inch thickness, having a number 74 size drill bore formed through the center thereof. The shim is then soft-soldered into a recess formed in the connector. Such a critical orifice size is appropriate for use with a vacuum of about 16 inches of mercury to provide five cubic feet per hour flow rate.

The above-described critical orifices, being of equal diameter, will provide a mixing ratio of 1:1 for the gas samples being continuously analyzed and the diluent air. For automobile engine exhaust gases, this ratio has been found to be adequate to insure complete combustion of the combustible gases and still provide adequate gas concentration to insure accurate analysis. Obviously, if a different ratio mixture is desired, the orifice sizes can be changed accordingly. However, in order to insure constant flow rates regardless of minor variations in vacuum, the orifices should be operated at approximately the critical orifice vacuum as a minimum. It will, of course, be understood that the term critical orifice refers to operation of the orifice at a pressure differential at which, for an increase in pressure differential, no increase in flow rate occurs.

The connectors 104, 114 are attached to a main body portion 136 by appropriate threads or the like. The main body portion 136 will be seen to include the transfer chambers 108, 118 and the mixing chamber 110. The main body portion 136 has threaded bores 138 formed therein as appropriate in order to attach the main body portion 136 to the analyzer cabinet 10, or supporting structure within the cabinet.

The reaction chamber 33A is seen to consist of a reaction chamber proper 140, which is separated from the mixing chamber 110 by a filter compartment 142. The filter compartment 142 is filled with activated charcoal in order to stabilize fluid flow into the reaction chamber, as the input into the mixing chamber is a turbulent flow.

Activated charcoal of 6–16 mesh sizing may be utilized in the filter. By such utilization, the filter also acts in a manner analogous to a short chromatographic column, in that hydrocarbon peaks are eliminated. It will be apparent that, after a period of long operation with hydrocarbon input, a background reading on the meter 11 will develop by reason of the continuous elution of hydrocarbon components. However, by utilizing a short charcoal column, and comparatively short periods of analysis, with purging between consecutive analyses, the hydrocarbon peaks are eliminated while maintaining a negligible background reading from hydrocarbons. The activated charcoal is held in position in the reaction chamber 34 by means of a pair of screen washers 144, 146 disposed at opposite ends of the filter.

The reaction chamber 33A has, for the reaction chamber proper 140, an inlet 150, which is separated from the charcoal filter by the screen 146, and, at its opposite end, a reaction chamber outlet 152. The reaction chamber outlet 152 tapers into a threaded outlet portion 154, into which is fitted an outlet fitting 156. The outlet fitting 156 has a cylindrical bore extending through it. A vacuum pump tube 158 is attached to the fitting 156 and connected at its opposite end to the vacuum pump 36. Thus, the vacuum pump, when in operation, provides a pressure differential across the device extending from the inlet tubes 102, 110 through the screens 130, 132, the critical orifices 106, 116, the mixing chamber 110, charcoal filter 142, reaction chamber inlet 150, reaction chamber proper 140, and reaction chamber outlet 152.

The reaction chamber proper 140 has disposed within it the catalytic combustion resistance element 40 and the compensating resistance element 42. The catalytic combustion resistance element 40 is supported by a fitting 160 which extends into an aperture formed in the reaction chamber wall. The fitting 160 may be attached by any appropriate means, such as threading on the fitting and complementary threading in the aperture. A seal is preferably formed by means of an O-ring 162. A similar fitting 164 and O-ring 166 support and seal the compensating resistance element 42.

The resistance elements and their supporting fittings are shown in greater detail in FIG. 6, which is a side elevation, partially in section, of a typical resistance element. The element shown in FIG. 6 may be either the catalytic combustion element or the compensating element, as will be explained hereinafter. The fitting shown may be the fitting for either element but, for the purposes of description, will be assumed to be the catalytic combustion resistance element fitting 160. Therefore, in the following description, the resistance element will be assumed to be the catalytic combustion resistance element 40. Extending outwardly from either end of the resistance element 40 are support wires 170, 172 which, preferably, are electrical resistance wires of the same composition as the electrical resistance element and, simply, a continuation thereof. The resistance and support wires 170, 172 are spot welded to support arms 174, 176 respectively. The support arms are also electrical conductors but not of the resistance type. The support arms extend to a base fitting 178 which is shown as threaded so as to engage the aperture in the reaction chamber wall. One of the support arms, the support arm 174 shown in FIG. 6, is connected directly to a base 178. In this embodiment, the base 178 is an electrical conductor, as is the reaction chamber wall, and so provides the common ground connection 43 referred to with respect to FIG. 3. In such an embodiment, the support arm 176 extends through the hollow central portion of the base 178 and is held in position by means of a suitable insulating material 180. The support arm 176 terminates in an electrical terminal 182 which is insulated from a base flange 184 of the fitting 160. The base flange 184 serves to seal the O-ring against the wall of the reaction chamber. The electrical terminal 182 has the lead 45 connected to it by any appropriate means, such as by soldering.

Figure 7:
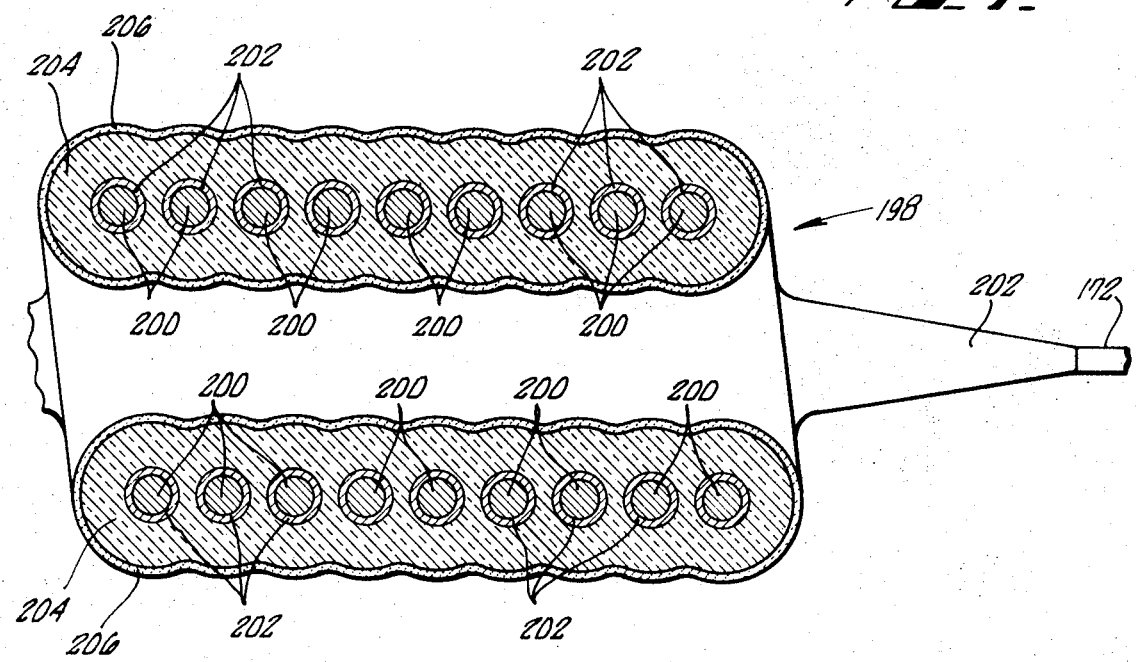
FIG. 7 is a view, in section, of a resistance element according to the present invention.

FIG. 7 is a view in section, greatly enlarged, of a typical resistance element 198 according to the invention. An electrical conductor of the electrical resistance type 198 is formed into a helical filament by any appropriate means. For example, the electrical conductor, conventionally wire, may be wound about a mandrel of suitable diameter. However, preferably, prior to being wound about the mandrel, the electrical conductor has a ceramic coating 202 formed about it to aid in preventing shorting between adjacent turns. After having been formed into the helical configuration, the wire is removed from the mandrel, and a coating of molten glass is applied to the filament, so as to form an insulating layer 204. The glass provides insulation between adjacent wire turns, as well as providing rigidity to the helical structure, so as to hold the wires apart from each other. However, the principal function of the glass seal so formed is to inhibit, if not eliminate, the loss of conductor material by evaporation. A layer of an oxide of either beryllium or aluminum, depending upon the utilization to be made of the resistance element, is then formed upon the glass insulating layer.

Figure 8:
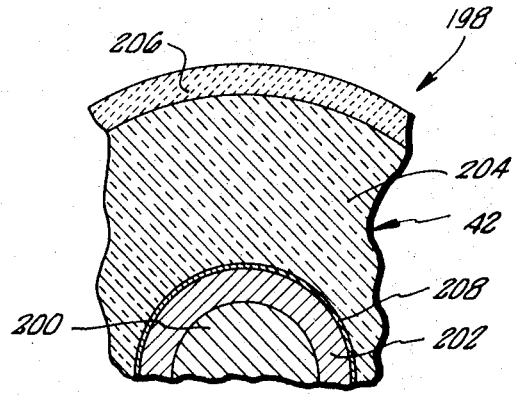
FIG. 8 is a partial sectional view illustrating the construction of a compensating resistance element according to the present invention.

The resistance element 198 shown in FIG. 7 is generic to the catalytic combustion resistance element 40 and to the compensating resistance element 42. Referring to FIG. 8, there is shown, in partial section, a portion of the compensating resistance element 42, which will illustrate the structure of the compensating resistance element with respect to the generic resistance element 198. In FIG. 8, a platinum film 208 is formed over the ceramic coating 202 on the conductor 200. The platinum film is so positioned that it separates the conductor from the glass layer 204 subsequently applied.

Figure 9:
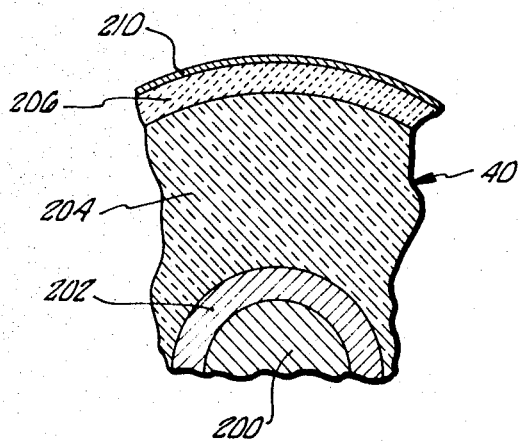
FIG. 9 is a partial sectional view illustrating the construction of a catalytic combustion resistance element according to the present invention.

In FIG. 9, a platinum catalytic layer 210 is shown as formed on the oxide coating 206. The use of platinum as a catalyst in this type of catalytic combustion is so well known in the art as to require no extensive discussion. The use of platinum as the catalyst, as distinguished from palladium for example, enables the device to be more sensitive when operated at a temperature in excess of 1200 degrees Fahrenheit. When operated at such a temperature, a palladium catalyst readily oxidizes, causing a loss in sensitivity which necessitates the frequent adjustment of the device and replacement of the resistance elements. Thus, palladium cannot, as a practical matter, be utilized in catalytic combustion resistance elements for accurate measurement at such high tempertures.

However, in conventional catalytic combustion resistance elements utilizing platinum as the catalytic element, problems of evaporation of the element, with the consequent zero shift of the device and catalytic element migration, heretofore referred to, as well as compensation necessitated by the thermal conductivity effect of the gas flow, have rendered such devices generally unsatisfactory, as compared to the operation of similar devices utilizing palladium as a catalyst but operating at considerable lower temperatures, for example, at about 800 degrees Fahrenheit. As has been pointed out heretofore, such a device, when operated at this lower temperature, becomes rapidly poisoned by lead compounds which exist in many gases to be analyzed, particularly internal combustion engine exhaust gases. Thus, palladium catalyst devices have not been found useful in continuously analyzing such gases, at least on a commercial basis. By utilizing the resistance elements of the present invention, and operating at temperatures in excess of 1200 degrees Fahrenheit, and more particularly at a temperature of 1400 degrees Fahrenheit, the leaded compounds in the exhaust gases are rapidly evaporated and thus do not poison the catalytic element.

As was pointed out, two particular problems resulting from the use of high temperatures and a platinum catalyst are evaporation of the resistance elements, i.e., the electrical conductor, which thus changes the balance in the Wheatstone bridge, but not in response to the detection of a gas, and thermal compensation. Furthermore, if the compensating resistance element being utilized is one which embodies a refractory material coating the electrical conductor, the evaporation of the electrical conductor, if the electrical conductor itself is a catalytic material, will cause a change in the sensitivity of the element. It will be seen that, because of the nature of the device, evaporation being a function of temperature, the catalytic resistance element conductor will evaporate at a higher rate than will the resistance element conductor in the compensating element. Thus, the electrical resistance of the catalytic element increases more rapidly than does that of the compensating element, necessitating the frequent zeroing of the instrument. Imbalance in the Wheatstone bridge circuit resulting from evaporation is precluded by the resistance elements of the present invention, and more specifically by the glass coating 204 utilized to surround the electrical conductor 200. This glass coating prevents the evaporation of the electrical conductor and, therefore, also prevents its migration to the surface of the compensating element. In conventional devices, such migration to the compensating element surface result in a catalytic reaction at the compensating element, and the consequent erroneous Wheatstone bridge imbalance due this catalytic reaction.

In gas analyzers of the present type, in which the gas flow passes directly over the resistance elements, it will be apparent that there is a heat loss from the resistance elements to this gas flow. If there is a differential between the two resistance elements as to the rate of heat loss, a Wheatstone bridge imbalance will result solely from the gas flow, as one of the resistance elements will, by reason of greater heat loss rate, be operating at a lower temperature than the other resistance elements. Accordingly, it is important, for analysis accuracy, that the two resistance elements have the same over-all heat transfer characteristics. It has been determined experimentally that, when operating at 1400 degrees Fahrenheit, matching the thermal radiation heat losses of the two resistance elements in the present invention is the most important factor in insuring thermal compensation.

For the element illustrated in FIG. 9, it has been found that the over-all heat transfer characteristic is controlled by the heat transfer characteristic of the oxide layer 206, if the oxide layer is aluminum oxide or other oxides conventionally used, and without the platinum catalytic layer 210. However, it has also been found that the addition of a platinum catalytic layer 210 results in an appreciable increase in the heat transfer characteristic of the element, resulting in a lower temperature of operation than would otherwise exist. This has been found to be true whether or not the glass layer 204 and ceramic coating 202 are utilized. Furthermore, this condition will exist whether or not the resistance elements are utilized in direct contact with the gas flow, as in the present device. Thus, even isolating the resistance elements from the gas flow, as for example in U.S. Patent No. 2,310,472, does not eliminate the thermal compensation problem. Therefore, the utilization of aluminum oxide as the coating for the compensating element will produce an erroneous Wheatstone bridge imbalance due solely to the heat transfer characteristic differential between the two resistance elements. Such a condition will exist irrespective of resistance element placement with respect to gas flow.

It has been found that a compensating resistance element could be made with an over-all heat transfer characteristic approximating that of a catalytic resistance element utilizing an aluminum oxide coating and platinum catalytic coating by the combination of an oxide coating of beryllium with a film of black platinum formed under the beryllium oxide coating. In the present invention, it has been pointed out that the glass layer 204 prevents evaporation of the electrical conductor with the consequent prevention of migration of the conductor to the surface of the compensating element. Such migration would, if the conductor is itself a catalytic material, produce catalytic combustion on the surface of the compensating element. Consequently, the black platinum film is disposed within the glass layer, so as to be precluded from migrating to the surface of the beryllium oxide and instituting catalytic combustion on the compensating element.

The resistance element structures just described, that is, the compensating element utilizing a film of black platinum beneath the beryllium oxide coating and the catalytic element utilizing an aluminum oxide coating over which is disposed a catalytic platinum coating, result in resistance elements whose over-all heat transfer characteristics are essentially equal, at least for the purposes of operation in the gas analysis devices of the present invention type in continuous operation. Such elements compensate for variations in reaction chamber pressures or vacuums, as well as for mixture flow rate variations.

If the elements are subject to on-off utilization, a difference in warm-up time exists, due to the differences in materials of construction. It has been found that the utilization of beryllium oxide for aluminum oxide in the active element reduces the significant warm-up time differential to the initial two seconds of energization without upsetting the heat transfer characteristic matching of the two elements. Therefore, when the present invention is utilized in on-off applications, the use of beryllium oxide in both resistance elements is preferable.

The foregoing description is believed to set out for those skilled in the art the elements of the present invention, both in its gas analyzer aspects and in its resistance element aspects. By way of further information, the following specifications are set out, but are to be considered as exemplary, rather than as limiting, with respect to the present invention. The electrical conductor may consist of a 0.002 inch diameter alloy of ten percent iridium and ninety percent platinum. This alloy is particularly useful in the present invention in constituting the conductor, in that it has approximately three times the structural rigidity of platinum at the temperature of 3000 degrees Fahrenheit, a temperature at which the glass coating may be applied to the resistance element. The ceramic coating may consist of a combination of aluminum oxide, lead oxide, and silicon dioxide. It will be appreciated that the function of the ceramic coating is to further insure against shorting of the adjacent turns of the resistance element and, if desired, the ceramic can be eliminated. In view of the desirability of operating the resistance element at a temperature of about 1400 degrees Fahrenheit, the glass chosen as the glass seal should have a very low viscosity at this temperature. However, the glass should be very fluid at a temperature of about 3000 degrees Fahrenheit, so that it will flow freely to form the seal. A satisfactory glass for forming the seal is sold by Corning Glass Works under the code number 1715, and has the characteristics of having a softening point of 1060 degrees centigrade, the softening point being defined as the temperature at which the glass has a viscosity of eight poises. The depositions of the campounds of aluminum and beryllium and of the black platinum film and the catalytic platinum coating may be performed in conventional fashion by immersing the resistance element component in water solutions of appropriate compounds which are decomposed by heating and then by application of an electrical potential across the conductor so as to heat the element to the desired decomposition temperature. The reaction chamber may constitute a cylindrical bore eleven-sixteenths inch in diameter and two and one-half inches in length. From the foregoing, it will be apparent that the resistance elements are themselves quite small. A typical resistance element may be formed by nine turns of wire closely wound about a 0.017 inch diameter mandrel.

The present invention has been illustrated in FIG. 1 as particularly utilizable in the analysis of internal combustion exhaust gases for carbon monoxides. The most important single application at present of the invention is the instantaneous analysis of automobile engine exhaust gases for carbon monoxide. Such instantaneous analysis permits the mechanic of no particular skill to quickly and accurately adjust or "tune" the automobile engine for minimum exhaust gas contaminant content. In other words, by utilization of the present invention, the amount of contaminants generated by automobiles and exhausted into the air as pollutant can be greatly reduced by proper engine tuning in a short period of experimental adjustment by an unskilled person.

The invention claimed is:
1. A compensating resistance element for use in a Wheatstone bridge type gas analyzer comprising:
   a filament formed of an electrical conductor whose electrical resistance varies with temperature;
   a glass seal formed about said conductor;
   a black platinum film formed between the glass seal and the conductor; and
   a coating formed on said glass seal, said coating being an oxide of a metal form the class of metals consisting of aluminum and beryllium.
2. A catalytic combustion resistance element for use in a Wheatstone bridge type gas analyzer comprising:
   a filament formed of an electrical conductor whose electrical resistance varies with temperature;
   a glass seal formed about said filament;
   a coating formed on said glass seal, said coating being an oxide of a metal from the class of metals consisting of aluminum and beryllium; and
   a catalytic coating formed on said oxide coating.
3. A combustible gas analyzer comprising:
   a source of gas to be analyzed;
   a source of diluent gas;
   a reaction chamber having an inlet and an outlet;
   means connecting said gas sources to said reaction chamber inlet;

a source of pressure differential in communication with said reaction chamber and operable to intitate simultaneous flow of gases from said gas sources through said connecting means, reaction chamber inlet, reaction chamber, and reaction chamber outlet;

flow control means disposed in said connecting means and operable to produce a constant rate of flow of gas from each of said sources through the reaction chamber; and a Wheatstone bridge type detector including:
(1) a catalytic resistance element disposed in said reaction chamber;
(2) a compensating resistance element disposed in said reaction chamber and having
a filament formed of an electrical conductor whose electrical resistance varies with temperature;
a glass seal formed about said conductor;
a black platinum film formed between the glass seal and the conductor; and
a coating formed on said glass seal, said coating being an oxide of a metal from the class of metals consisting of aluminum and beryllium; and
(3) gas concentration indicator means responsive to resistance imbalance in the Wheatstone bridge.

4. The apparatus of claim 3, and in which the catalytic combustion resistance element has:
a filament formed of an electrical conductor whose electrical resistance varies with temperature;
a glass seal formed about said filament;
a coating formed on said glass seal, said coating being an oxide of a metal from the class of metals consisting of aluminum and beryllium; and
a catalytic coating formed on said oxide coating.

5. In a catalytic combustion gas analyzer of the Wheatstone bridge type, the combination of:
a catalytic combustion resistance element sealed by glass against resistance element evaporation;
a compensating resistance element sealed by glass against resistance element evaporation and which is catalytically inert and has the same over-all heat transfer characteristics as the catalytic resistance element;
mens electrically connecting said resistance elements in the Wheatstone bridge circuit;
a source of gas to be analyzed;
a source of diluent gas;
means for initiating a constant flow of a selected ratio mixture of said gases simultaneously against said catalytic resistance element and said compensating resistance element.

6. The combination of claim 5, and including activated charcoal filter means operable as a short chromatographic column, and means for flowing said gas mixture through said filter means prior to flow against said resistance elements.

7. The combination of claim 5, and in which the means for initiating a constant flow of a selected mixture of said gases includes a pair of critical orifices, one disposed in the flow path of each of said gases, and a mixing chamber disposed in the flow path of the gases between said critical orifices and the resistance elements.

8. The combination of claim 5, and in which the catalytic combustion resistance element has:
a filament formed of an electrical conductor whose electrical resistance varies with temperature;
a glass seal formed about said filament;
a coating formed on said glass seal, said coating being an oxide of a metal from the class of metals consisting of aluminum and beryllium; and
a catalytic coating of platinum formed on said oxide coating.

9. The combination of claim 5, and in which the compensating resistance element has:

a filament formed of an electrical conductor whose electrical resistance varies with temperature;
a glass seal formed about said conductor;
a black platinum film formed between the glass seal and the conductor; and
a coating formed on said glass seal, said coating being an oxide of a metal from the class of metals consisting of aluminum and beryllium.

10. The combination of claim 9, and in which the catalytic combustion resistance element has:
a filament formed of an electrical conductor whose electrical resistance varies with temperature;
a glass seal formed about said filament;
a coating formed on said glass seal, said coating being an oxide of a metal from the class of metals consisting of aluminum and beryllium; and
a catalytic coating of platinum formed on said oxide coating.

11. The combination of claim 10, and including activated charcoal filter means operable as a short chromatographic column, and means for flowing said gas mixture through said filter means prior to flow against said resistance elements.

12. The combination of claim 10, and in which the means for initiating a constant flow of a selected mixture of said gases includes a pair of critical orifices, one disposed in the flow path of each of said gases, and a mixing chamber disposed in the flow path of the gases between said critical orifices and the resistance elements.

13. A combustible gas analyzer comprising:
a source of gas to be analyzed;
a source of diluent gas;
a reaction chamber having an inlet and an outlet;
means connecting said gas sources to said reaction chamber inlet;
a source of pressure differential in communication with said reaction chamber and operable to initiate simultaneous flow of gases from said gas sources through said connecting means, reaction chamber inlet, reaction chamber, and reaction chamber outlet;
flow control means disposed in said connecting means and operable to produce a constant rate of flow of gas from each of said sources through the reaction chamber; and
a Wheatstone bridge type detector including:
(1) a catalytic resistance element disposed in said reaction chamber, and having
a filament formed of an electrical conductor whose electrical resistance varies with temperature;
a glass seal formed about said conductor;
a coating formed on said glass seal, said coating being an oxide of a metal from the class of metals consisting of aluminum and beryllium; and
a catalytic coating formed on said oxide coating;
(2) a compensating resistance element disposed in said reaction chamber; and
(3) gas concentration indicator means responsive to resistance imbalance in the Wheatstone bridge.

References Cited

UNITED STATES PATENTS

| | | | |
|---|---|---|---|
| 2,805,134 | 9/1957 | Strange | 23—255E |
| 3,117,843 | 1/1964 | Baker | 23—254E |
| 3,251,654 | 5/1966 | Palmer | 23—255E |
| 3,460,909 | 8/1969 | Gayle | 23—232E |

MORRIS O. WOLK, Primary Examiner

E. A. KATZ, Assistant Examiner

U.S. Cl. X.R.

23—288; 73—27; 117—217; 338—25

UNITED STATES PATENT OFFICE
CERTIFICATE OF CORRECTION

Patent No. 3,586,486            Dated June 22, 1971

Inventor(s) Young Ho Kim et al.

It is certified that error appears in the above-identified patent and that said Letters Patent are hereby corrected as shown below:

Column 11, line 45, "mens" should read -- means --.

Signed and sealed this 11th day of April 1972.

(SEAL)
Attest:

EDWARD M. FLETCHER, JR.            ROBERT GOTTSCHALK
Attesting Officer                    Commissioner of Patents